United States Patent [19]

Gomez

[11] Patent Number: 5,078,074
[45] Date of Patent: Jan. 7, 1992

[54] VEHICLE HORN

[76] Inventor: Laurence B. Gomez, 78-700 Starlight La., Bermuda Dunes, Calif. 92201

[21] Appl. No.: 497,427

[22] Filed: Mar. 22, 1990

[51] Int. Cl.⁵ .................... G10K 9/00; G10K 9/22; G08B 3/00
[52] U.S. Cl. ..................... 116/137 R; 116/142 R; 181/152; 181/159
[58] Field of Search ......... 116/137 R, 142 FP, 142 R; 403/338; 181/152, 159; 248/224.1

[56] References Cited

U.S. PATENT DOCUMENTS

| | | | |
|---|---|---|---|
| 1,366,493 | 1/1921 | Reynolds | 116/137 R |
| 1,663,648 | 3/1928 | Cooper . | |
| 1,868,250 | 7/1932 | Paulus . | |
| 1,901,187 | 3/1933 | Osborne | 116/137 R |
| 1,926,688 | 9/1933 | Schaal . | |
| 2,058,208 | 10/1936 | Blattner . | |
| 2,084,674 | 6/1937 | Down | 116/137 R |
| 2,299,447 | 10/1942 | Wood | 116/137 R |
| 2,326,941 | 8/1943 | Heitner | 403/338 |
| 2,521,148 | 9/1950 | Buell . | |
| 2,689,543 | 9/1954 | Lemmon . | |
| 3,909,530 | 9/1975 | Gosswiller . | |
| 4,171,677 | 10/1979 | Hibell | 116/137 R |
| 4,171,678 | 10/1979 | Palm . | |
| 4,176,580 | 12/1979 | Gallegos | 248/224.1 |
| 4,314,522 | 2/1982 | Frigo . | |
| 4,382,572 | 5/1983 | Thompson | 248/224.1 |
| 4,825,800 | 5/1989 | Kitchen | 116/137 R |
| 4,829,930 | 5/1989 | Fischer et al. . | |
| 4,838,831 | 6/1989 | Rumberger | 403/338 |
| 4,903,630 | 2/1990 | Rezmer | 116/28 R |
| 4,932,619 | 6/1990 | Usui | 248/74.1 |

FOREIGN PATENT DOCUMENTS

| | | |
|---|---|---|
| 1483399 | 3/1969 | Fed. Rep. of Germany . |
| 1077792 | 8/1967 | United Kingdom ............. 248/224.1 |

*Primary Examiner*—William A. Cuchlinski, Jr.
*Assistant Examiner*—C. W. Fulton
*Attorney, Agent, or Firm*—Christie, Parker & Hale

[57] ABSTRACT

A vehicle horn has a shield which covers the mouth of the horn's bell to prevent debris from entering the bell. A front sound opening beyond the bell mouth perimeter allows sound to project forwards while still protecting the bell and a rear sound opening aligned with the front sound opening allows debris to pass through both openings without collecting within the space between the bell mouth and the shield. A side surface shields that space and includes a bottom cutout which allows any debris collected to fall out of the space. A vehicle horn has a bell constructed of two tubular sections, the end of each section having a mating flange which fits into a specially adapted clamp. As the clamp is tightened, the tube sections are drawn together until they butt against each other. The clamp is tightened by securing mating collar portions against each other. A pedestal and a rear mounting base are used to connect the horn to a vehicle. The rear mounting base and a mounting bolt are connected to the vehicle. The horn has a pedestal for supporting its bell with a foot that slides around the mounting bolt and a rear mounting surface that slides onto the rear mounting base. These allow the horn to slide into engagement with the vehicle.

48 Claims, 7 Drawing Sheets

VEHICLE HORNVEHICLE HORN

FIELD OF THE INVENTION

The present invention pertains to the field of vehicle horns, and in particular to air and gas horns which are typically mounted on the exterior of commercial vehicles.

BACKGROUND OF THE INVENTION

Heavy duty trucks and boats, as well as other vehicles, often carry air or gas powered horns on the surface of their roof, fender or deck. The horns are typically bolted on the surface and directed forward to deliver a powerful warning to those in danger of colliding with the heavy truck or boat. Typically, these horns have a rear sound unit which connects to a long bell, measuring sometimes in excess of 36 inches (1 meter) long which opens at a flared end. The bell is bolted to the vehicle pointing forward so that its warning blast is best heard by those in front of the vehicle. Because the bell is pointed forwards as the vehicle moves, the bell tends to collect debris including not only snow and rain, but also insects, sand and dirt which have been kicked up into the air in front of the vehicle as it travels. While it is known to put a metal cover over the front of a heavy duty truck air horn, these guards reflect most of the sound coming out of the horn backwards, making it difficult for those in front of the truck to hear the warning blast. It is also known as shown in U.S. Pat. No. 4,171,678, to place a weather shield over the front of a heavy duty truck horn with slots in it to allow sound to project forwards. However, these slots also allow debris to enter the horn.

Conventional air horns also have other problems. First, because of the length of the bells, most air horns are difficult to ship and store, before they are mounted on the vehicle. Second, when the horn is bolted to the surface of the vehicle, it is difficult to remove and repair or replace. For example, bolts must often be loosened from the underside of the surface to which the horn is applied, requiring interior parts to be temporarily removed. Thus, long horns are typically made in two parts with the front bell section welded, soldered or brazed to the rear section. Attaching the two sections is costly.

SUMMARY OF THE INVENTION

The invention provides a weather shield, which allows sound to project both frontwards and backwards from the end of a vehicle horn bell. It also prevents debris from entering the horn bell and prevents debris from accumulating behind the shield. In one embodiment, the invention is a shield for a vehicle horn bell mouth, having a front wall adapted to extend across the bell mouth and beyond the mouth periphery, spaced apart from the bell mouth. The shield allows sound from the bell mouth to travel beyond the mouth periphery and has a sound opening in the front wall adapted to be outside the mouth periphery, to allow sound traveling beyond the mouth periphery to travel out the sound opening. The sound opening is adapted to direct sound in a forwards direction with respect to the vehicle. A rear opening is aligned with the front sound opening to allow debris entering the front sound opening to exit through the rear sound opening. The shield includes a side wall which extends from the edge of the front wall and the bell mouth, preferably along the entire perimeter of the front wall and beyond the mouth periphery. This side wall may have a cutout to allow debris collected in the space between the bell and the shield to fall through the cutout, out of the space.

The invention also encompasses a vehicle horn having a bell mouth adapted to be mounted facing a forward direction with respect to a vehicle, and a shield with a front wall spaced apart from the bell mouth extending across and in front of the bell mouth beyond the bell mouth periphery. The shield has a sound opening in the front wall beyond the bell mouth periphery for allowing sound to travel forwards from the bell mouth out the sound opening. Preferably, the shield defines a rear opening between the shield and the bell mouth periphery for allowing sound to travel backwards from the bell mouth out the rear sound opening. A side wall may extend rearward from the front wall perimeter to shield the space between the bell mouth and the front wall. A rear opening between the side wall and the bell mouth periphery aligned with the front opening allows debris which enters the sound opening to exit through the rear opening. The sound openings on the front wall preferably are slots on opposite sides of the front wall, and the front wall includes a sound guide for directing sound from the bell mouth to the sound opening.

In one embodiment, the present invention provides a two part vehicle air horn bell which can be easily assembled and easily removed from the vehicle, making the horn easier to ship, install and service. In this embodiment, the vehicle horn has a first bell section with an opening at one end and a second bell section with an opening at an end facing the first section end and a clamp adapted to receive the first and second bell section ends and hold the openings facing each other, to form a continuous sound passage between the first and second bell sections. Preferably, the first and second bell section ends have flanges which extend outward from their central axes and butt against each other on respective surfaces when held in the clamp. The clamp preferably has a first collar portion extending around one part of the first and second bell section ends and a second collar portion extending around another part of the first and second bell section ends connecting to the first collar portion. Preferably, the collar portions have an inner groove for receiving and retaining the first and second bell section flanges. The clamp also preferably includes a pedestal for supporting the horn on a surface.

The present invention allows a vehicle air horn to be quickly and conveniently removed and replaced on the surface of a vehicle without removing bolts and without manipulating bolts on the underside of the vehicle's surface. In such an embodiment, the invention encompasses a method for mounting a horn on a vehicle, which involves fastening a rear mounting base to the vehicle and then sliding a horn having a rear mounting surface into engagement with the vehicle, so that the rear mounting surface engages the rear mounting base. Preferably, the method includes sliding a front pedestal on the horn into engagement with the vehicle, at the same time as sliding the rear mounting surface into engagement, so that, when engaged, the horn is supported by both the rear mounting base and the pedestal. Preferably, sliding a horn having a rear mounting surface comprises sliding mating, elongated and converging surfaces towards each other until the surfaces meet. In one embodiment, this involves sliding elongated and converging ribs, into a mating, elongated and converging channel until the ribs butt against the channel.

The invention also encompasses a vehicle mounting assembly for a vehicle horn with a rear mounting base fastenable to a vehicle surface and a rear mounting surface connected to the horn for slidably engaging the rear mounting base. The rear mounting base and rear mounting surface preferably have elongated and converging surfaces which butt against each other for engagement. These surfaces include elongated and converging ribs and an elongated and converging channel, so that the ribs butt against the channel for engagement. The invention also comprises a pedestal for slidably engaging the horn with the vehicle surface when the rear mounting surface is slidably engaged with the rear mounting base. The pedestal has a collar for supporting the horn's bell and a foot fastenable to the vehicle's surface. The foot has spaced apart adjacent fingers for receiving a bolt within a space between the fingers. The rear mounting base and the pedestal are adapted to be slidably engaged when the horn reaches the rearward limit of its travel with respect to the vehicle.

BRIEF DESCRIPTION OF THE DRAWINGS

FIG. 6, including FIGS. 6A and 6B, is a top elevational view of a rear mounting base and a bottom elevational view of a rear mounting surface according to the present invention;

FIG. 7, including FIGS. 7A and 7B, is a rear elevational view of the rear mounting base and the rear mounting surface shown in FIG. 6;

DETAILED DESCRIPTION OF THE INVENTION

Figures 1, 4:
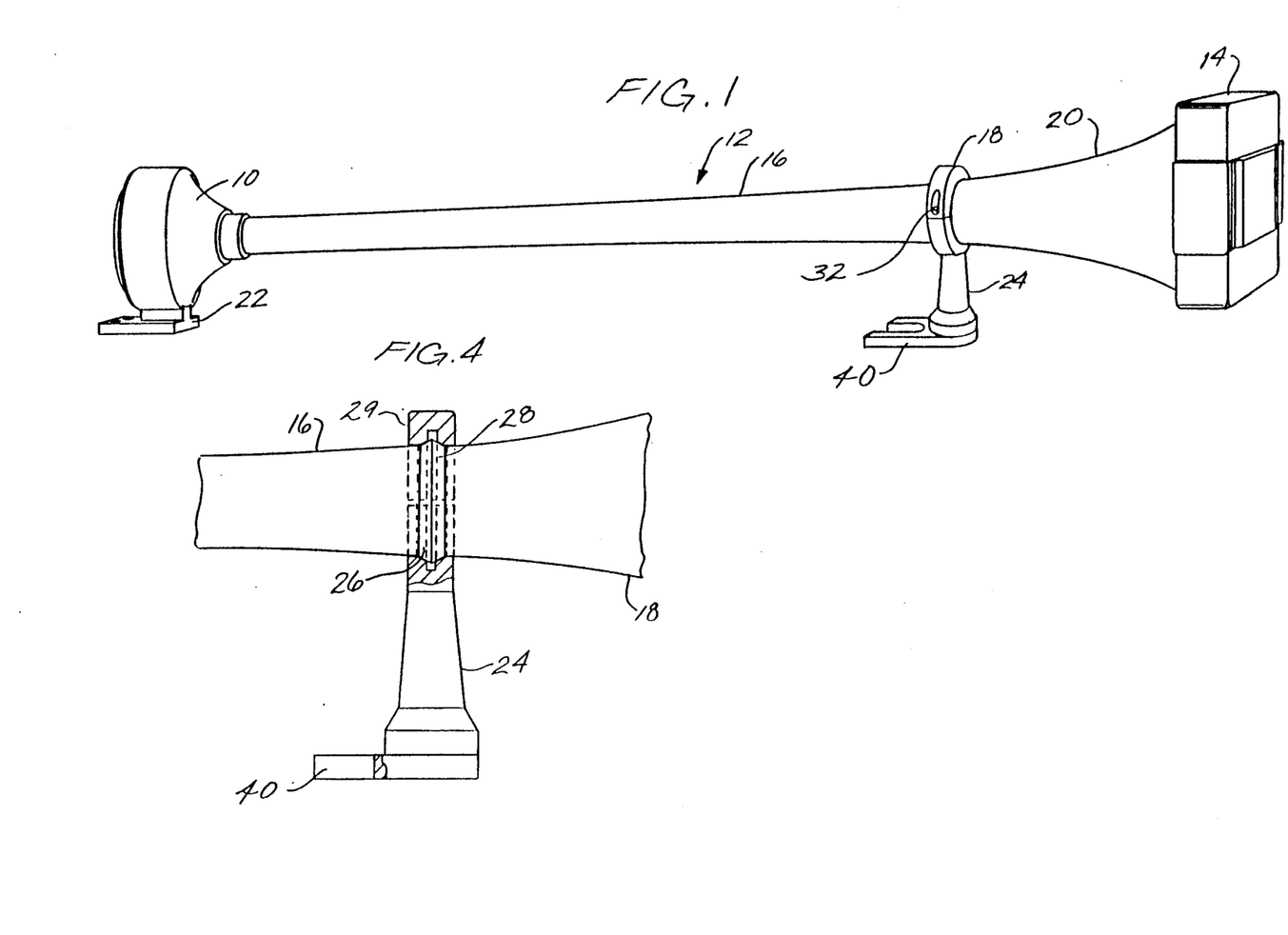
FIG. 1 is a perspective view of a horn for attachment to a vehicle surface according to the present invention.
FIG. 4 is a side elevation partially cut away view of the apparatus of FIG. 2 assembled showing the upper part of the clamp in cross section.

The present invention relates to a vehicle horn suitable for use on light, medium and heavy duty trucks, boats and other vehicles. As shown in FIG. 1, at the rear end of the horn is a conventional sound unit 10 which can be driven electrically or by air pressure, and preferably vibrates a diaphragm to create sound pressure air waves that travel forwards from the sound unit. These sound waves travel through a bell 12 to a shield 14. The air horn is typically mounted on a vehicle facing forwards so that sound generated in the sound unit 10 is projected forwards through the bell directly to those in front of the vehicle. Since the open end of the horn's bell faces forwards, airborne debris tend to move towards the open end of the horn's bell as the vehicle travels. This debris is blocked by the shield 14.

The horn's bell is divided into two sections. The first section is the tube 16 which extends from the sound unit 10 to a clamp 18. The tube's diameter increases slowly as it nears the clamp. The second section 20 is the flare which increases diameter at a much greater rate than the tube section and extends from the clamp 18 to the end of the bell, which is partially obscured in FIG. 1 by the shield 14. The air horn is fastened to the truck using a rear mounting base 22 and a front pedestal 24 which are bolted onto the surface of the vehicle as described below. The pedestal 24 supports and is preferably connected to the clamp 18. The horn bell is preferably chrome plated brass, but other materials can be used.

Figure 2:
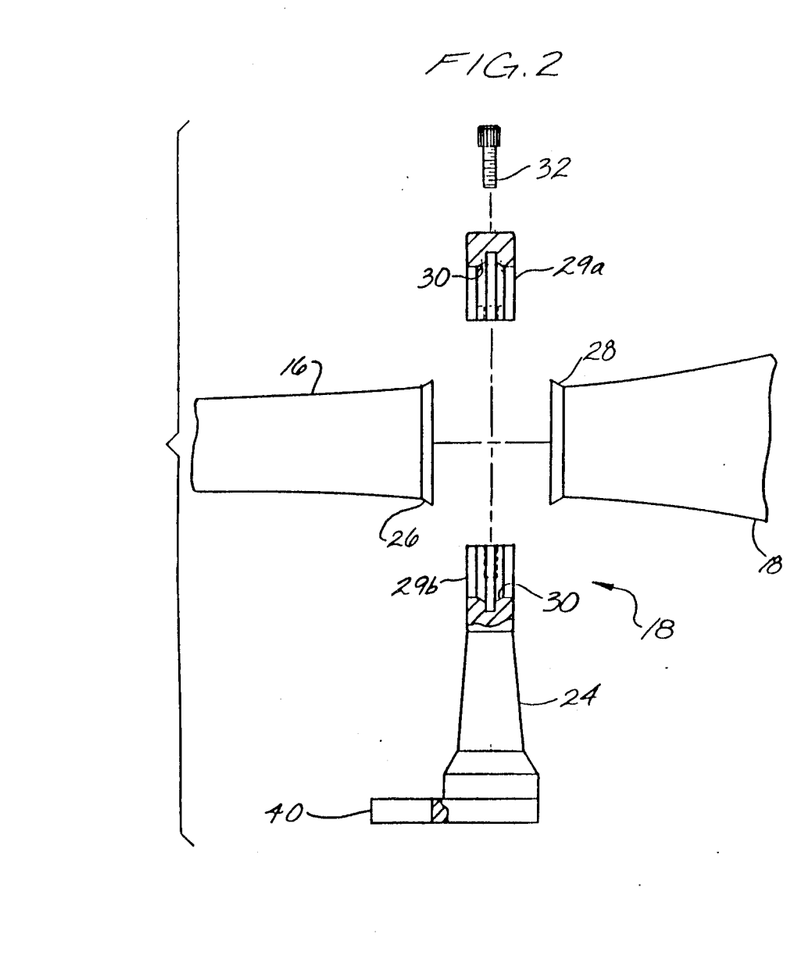
FIG. 2 is an exploded side view of bell sections and a partially cross-sectional view of a clamp for fastening the bell sections together and for attachment to a vehicle surface according to the present invention.
Figure 3:
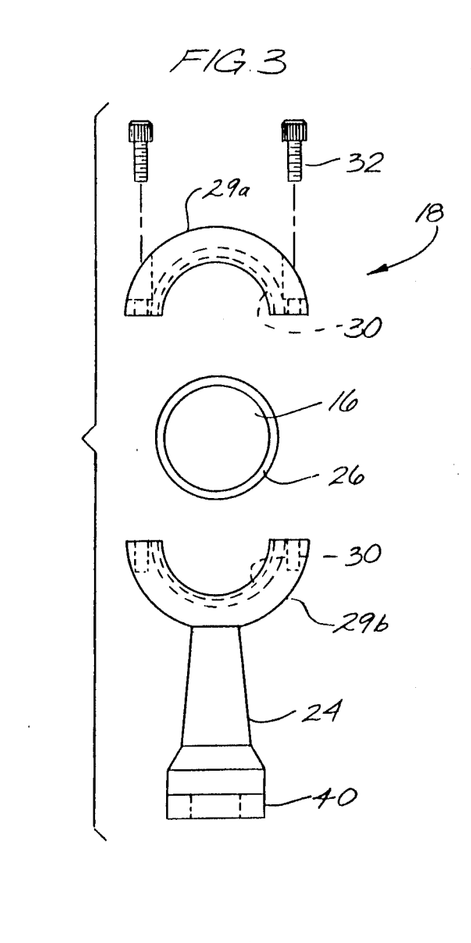
FIG. 3 is an exploded front elevational view of the clamp of FIG. 2.

At the end of both the tube section and the flare section there is a flange 26, 28 as shown in FIG. 2. Both flanges have the same diameter and flat ring-shaped ends so that when they are placed against each other, a continuous smooth channel is formed for sound traveling through the bell. The flanges are designed to fit into the clamp 18. The clamp has a collar 29 which completely surrounds the bell, as best seen in FIG. 3. Both the semi-circular top portion of the collar 29a and the semi-circular bottom portion of the collar 29b have a groove 30, the shape of which matches the outer periphery of the flanges 26 and 28. As a result, when the tube sections are butted against each other, the two collar portions can be closed together to encircle the ends of the bell sections and hold the two bell sections securely in place. As best seen in FIGS. 1 and 3, the two collar portions are held together with machine screws 32, which extend through the top collar portion 29a into the bottom collar portion 29b. Since the flanges extend outwards from the central axis of the bell, there is no constriction in the bell where the two bell sections met. In addition, the bell sections cannot be removed from the clamp when the two collar portions are connected together. The two sections are accordingly held tightly and firmly together without solder or brazing. Although solder may be used to strengthen the connection, this hampers disassembly.

A variety of arrangements are possible for the groove 30 of the clamp, and it is not necessary that the two bell sections butt against each other when the clamp is connected. For example, the clamp could hold the two bell sections apart from each other and bridge the gap between the two bell sections. The present arrangement is preferred to minimize vibration and to maximize strength of the assembled parts. Since the flange is angled outwards and it matches the angle of the groove in the collars, as the top and bottom collar portions are screwed down together, the outside surface of the flanges slide against the surface of the groove until the two bell sections are wedged against each other in the groove, around their entire perimeters. This helps reduce vibration. When the flanges butt against each other, the collars are fully tightened and the assembly of the bell is complete. While the flares shown in the drawings are preferred, a variety of other tube ends may be used instead. The tubes may be straight, have flat rims or curve inwards, for example.

Constructing a bell in two parts is valuable not only to reduce shipping costs and make parts easier to store, but it also can significantly reduce manufacturing costs. It is at present costly to manufacture a one piece bell with the significant length required and the substantial flare at the end. Frequently, air horns are made by taking a straight tube, which has been swaged out at one end and joining it to a die cast flare section. Air horn bells presently on the market commonly have a seam where the two bell sections have been soldered or brazed together. Brazing the pieces together is expensive and time consuming. The bells are often chrome plated or painted to help cover the seam. The seam between the bell sections is also a weak point in the horn. Constructing the two bell sections in two pieces and holding them together with a clamp eliminates this weak point and substitutes the strength of the clamp for the weakness of the seam. It also allows the horn to be repaired in parts. If there is an injury to the bell's flare, the flare section can be removed and replaced without affecting the tube section, for example. For particularly long horns, the bell can be built in three or more sections and two or more clamps are then used as necessary.

Figure 5:
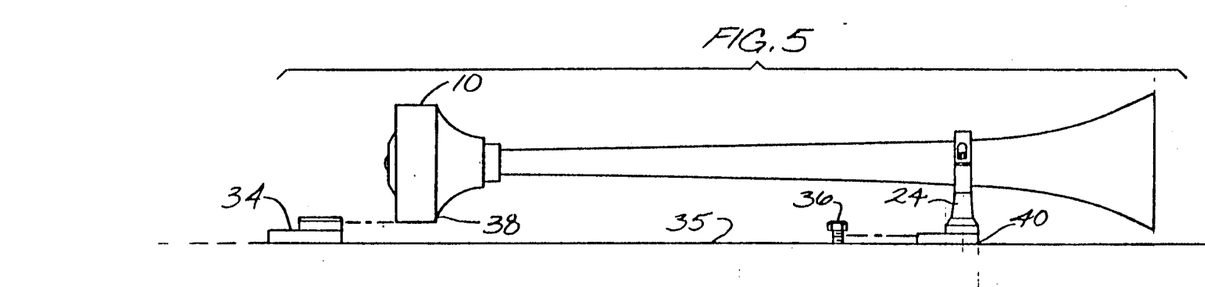
FIG. 5 is a side elevational view of a horn according to the present invention showing how it is mounted to a vehicle surface.

In addition to being easily assembled, the horn of the present invention is also easily and quickly installed on a vehicle. As shown in FIG. 5, to mount the horn, a rear mounting base 34 is first fastened to the vehicle surface 35, for example the roof of a heavy truck. Then a mounting bolt 36 is connected forward of the rear mounting base. The horn is installed onto the rear mounting base and the bolt by sliding a rear mounting surface 38, preferably connected to or a part of the sound unit 10 of the horn, into the rear mounting base while sliding a foot 40 of the horn's pedestal 24 around the front bolt. When the horn reaches the limit of its rearward travel into the rear mounting base and around the mounting bolt, the mounting bolt 36 is screwed down against the foot of the pedestal and the horn is securely locked in place. To remove the horn, the mounting bolt is simply loosened and the horn is slid forwards out of its mounts. As a result, once the rear mounting base and the mounting bolt have been installed, the horn can be very quickly removed and replaced or serviced. An antitheft or locking bolt can be used for the mounting bolt, if desired, to make the horn a little more difficult to remove.

Figures 6, 6A, 6B:
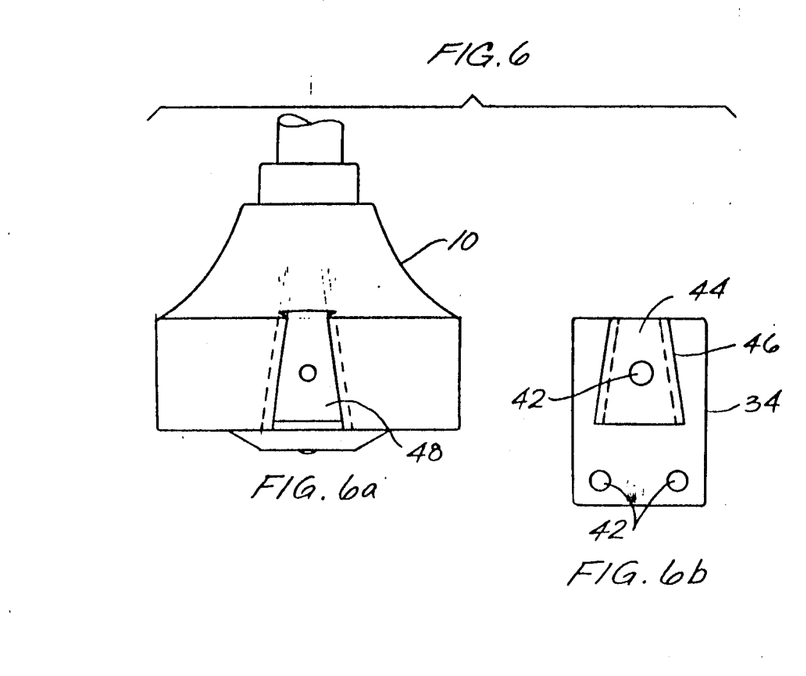
Figures 7, 7A, 7B:
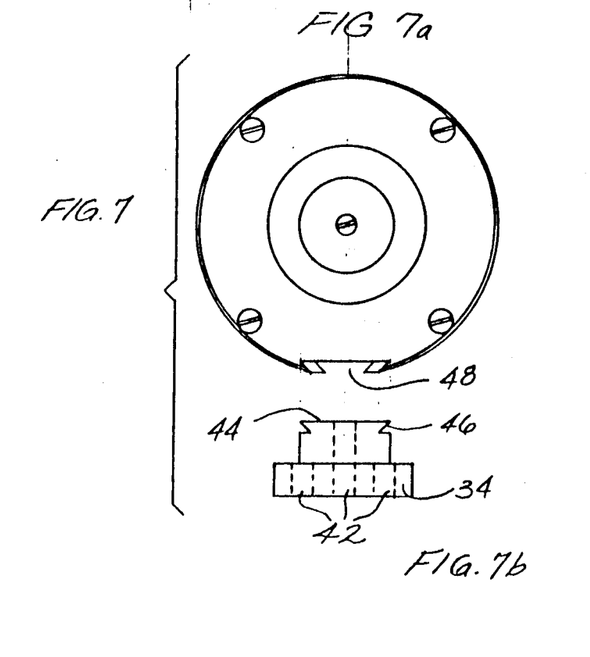

The rear mounting base 34, as shown in FIGS. 6 and 7, has a set of bolt holes 42 for fastening the base to the surface of the vehicle. Any type of fastening method may be used, however, bolts are presently preferred. It also has a raised dove-tailed surface 44 extending above the bottom portion of the base. This surface has elongated ribs 46 which converge towards the front of the rear mounting base. The sound unit 10 has a mounting surface 48 in the form of a channel, which is adapted to mate with the mounting surface of the rear mounting base. As shown in FIG. 6, the channel 48 is also elongated and converges towards the front of the sound unit. This allows the two elongated and converging surfaces to be inserted one into the other until the ribs 46 butt against the converging elongated channel 48, engaging the rear mounting base with the horn's rear mounting surface. As best seen in FIG. 7, the surfaces are not only elongated and converging, but also angled inwardly to form mutually interfering surfaces so that the sound unit cannot be pulled vertically up from the rear mounting base once it is installed. While the horn is illustrated with the channel in the sound unit and the mounting surface on the mounting base, these positions can be reversed with no loss in utility. In addition, the horn's mating surface can be located elsewhere on the horn or formed in some other manner if desired.

Figure 8:
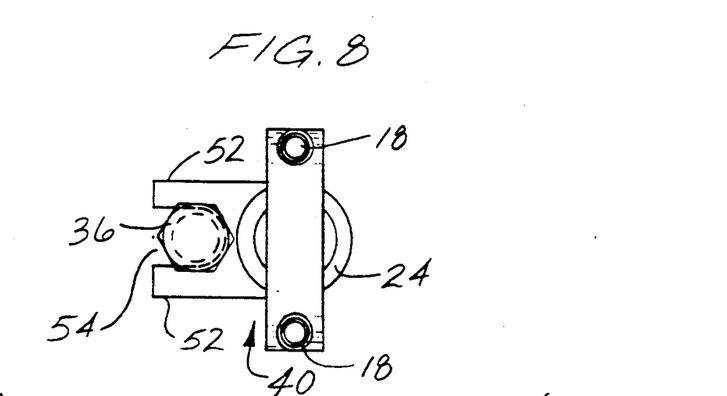
FIG. 8 is a top elevational view of the clamp of FIGS. 2, 3 and 4 fastened to a surface by a mounting bolt.

The pedestal foot 40 is similarly designed to lock into place around and under the mounting bolt 36. FIG. 8 shows the pedestal as viewed from the top. The pedestal has a foot 40 which has two spaced apart elongated fingers 52. These fingers define a slot 54 between them which receives the mounting bolt 36. The head of the mounting bolt extends over the tops of the fingers so that by tightening the mounting bolt against the vehicle surface, the fingers are clamped against the vehicle surface and the horn is held securely in place. If the mounting bolt were not tightened, the air horn could be quickly removed simply by sliding it forwards with respect to the vehicle. This could occur inadvertently when braking, for example, so the mounting bolt is important to hold the air horn to the vehicle. A variety of other sliding fastening devices may be used within the scope of the present invention. A dove-tailed mounting arrangement similar to the rear bracket, for example, could be used to hold the front pedestal in place. In addition, the front mount or the rear mount can be eliminated altogether. It is common for horns with short bells to use only a rear mounting. For longer horns, more than two mounts can be used.

It is at present well known to use an open collar as a pedestal for the front end of an air horn. The collar forms approximately a three-quarter circle so that a narrow part of the tube section of the bell can be passed through the opening in the collar. The air horn can then be drawn backwards so that as the bell flares outwards it is wedged tight against the collar. This type of collar can be combined with the rear mounting arrangement of FIGS. 6 and 7 in place of the clamp shown so that the air horn is wedged into position in the front open collar and into the rear mounting base at the same time. Again, however, it is preferred that some device to prevent the inner horn from moving forwards be used.

Figure 9A:
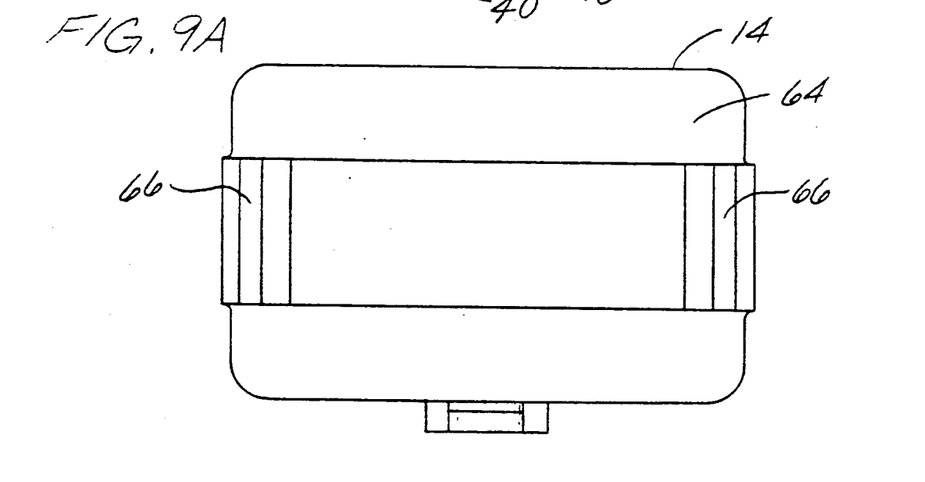
FIG. 9A is a front elevational view of the horn of FIG. 1.
Figure 9B:
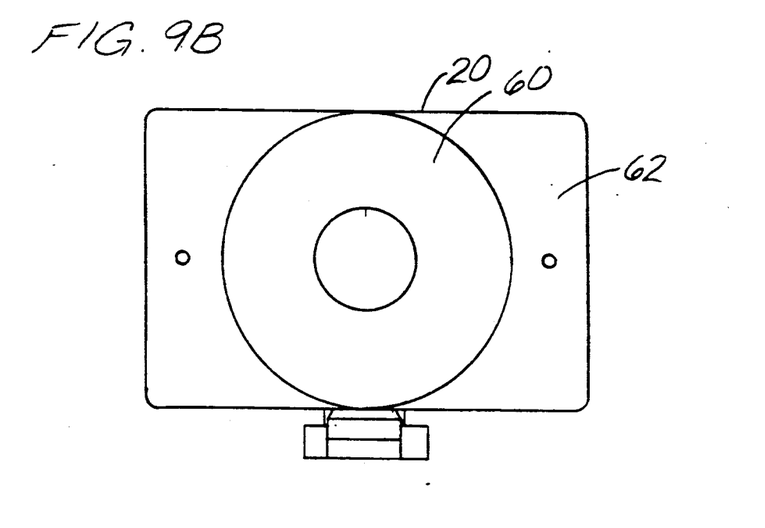
FIG. 9B is a front elevational view of the horn of FIG. 1 with the shield removed.

The present invention includes a shield 14, shown in FIG. 9A, to prevent foreign debris from accumulating within the bell of the air horn. The shield fits over the end of the bell 20 shown in FIG. 9B. The bell has an opening 60 from which the sound generated by the sound unit 10 emanates. Around the perimeter of this opening is an end plate 62, which is preferably flat. The opening 60 and the end plate 62 together constitute the mouth of the bell. While it is presently preferred that the bell end in a round opening surrounded by a rectangular end plate, the bell can also be constructed to end in a rectangular opening with or without an end plate, or to end in a round opening with or without a round or square end plate. An end plate is presently preferred, in part because it prevents some debris from entering the bell mouth and it provides a secure mounting location for the shield.

Figure 9C:
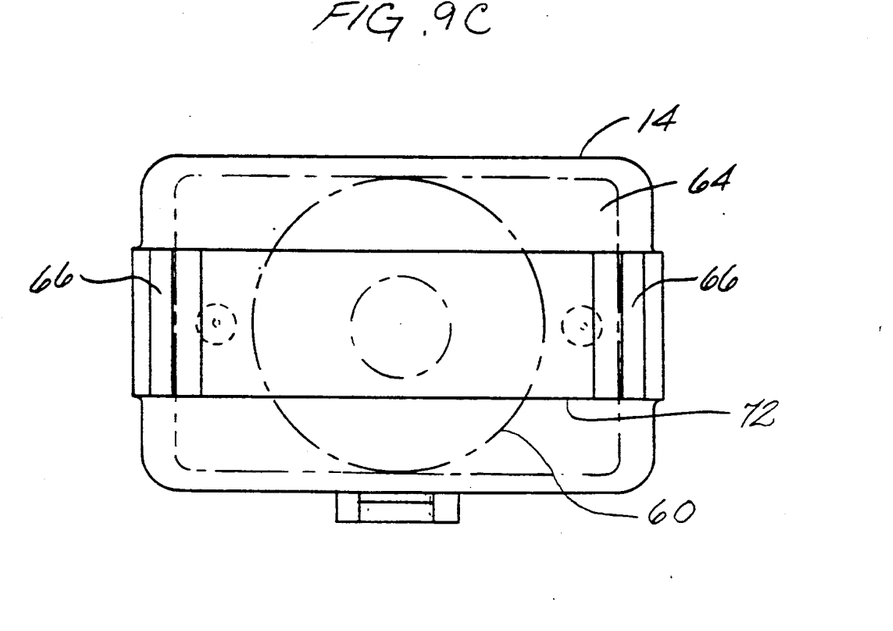
FIG. 9C is a front elevational view of the horn of FIG. 1 showing the bell of FIG. 9B in broken lines.
Figure 10:
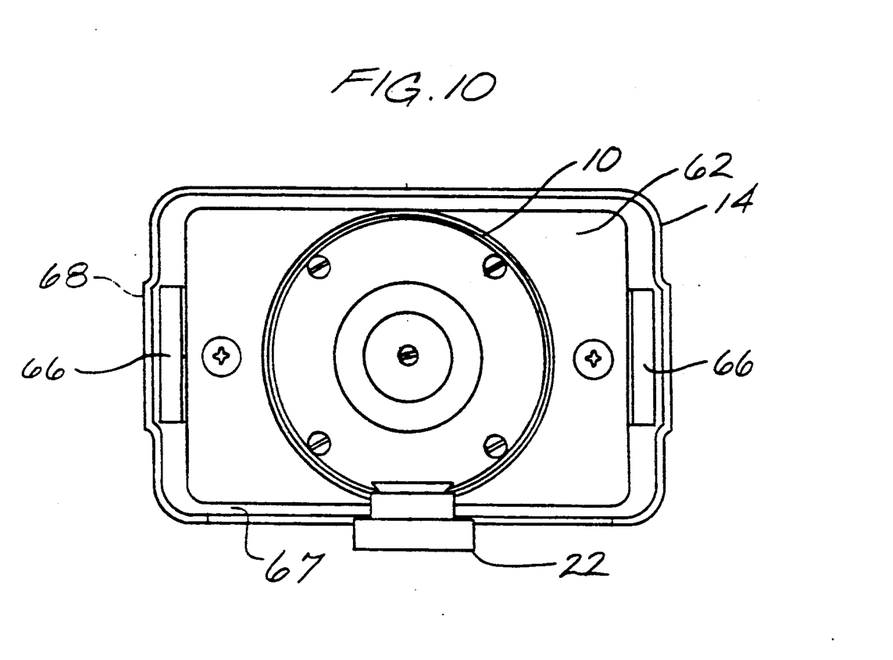
FIG. 10 is a rear elevational view of the horn of FIG. 1.
Figure 11:
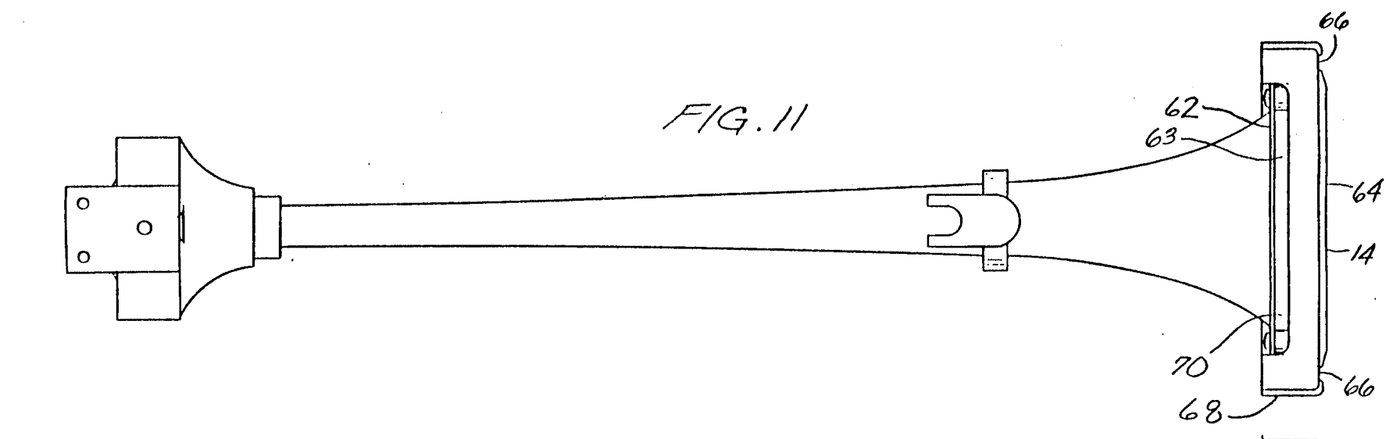
FIG. 11 is a bottom elevational view of the horn of FIG. 1.

The shield 14 has a front wall 64 which extends across the opening of the bell 60 and preferably across the entire bell mouth, including the end plate 62 as indicated in FIG. 9C. This front wall is the obstacle to debris, which would otherwise enter into the bell opening 60. Beyond the perimeter of the bell mouth are two sound openings 66, in the form of slots on opposite sides of the shield's front wall from each other. The inside surface of the front wall of the shield 64 is spaced apart from the end plate 62, as shown in FIG. 11, so that sound emanating from the opening 60 is trapped in the space 63, between the wall 64 and the plate 62 and is forced to the sides, where it can then travel out the slots 66 on either side of the bell opening 60. These slots allow a large portion of the sound to travel forwards so that the warning blast from the air horn is sent to those directly in front of the vehicle. As shown in FIGS. 9C and 10, the slots are placed beyond the perimeter of the bell mouth (60 and 62) so that any debris which enters the slots does not meet the bell mouth.

Figure 12:
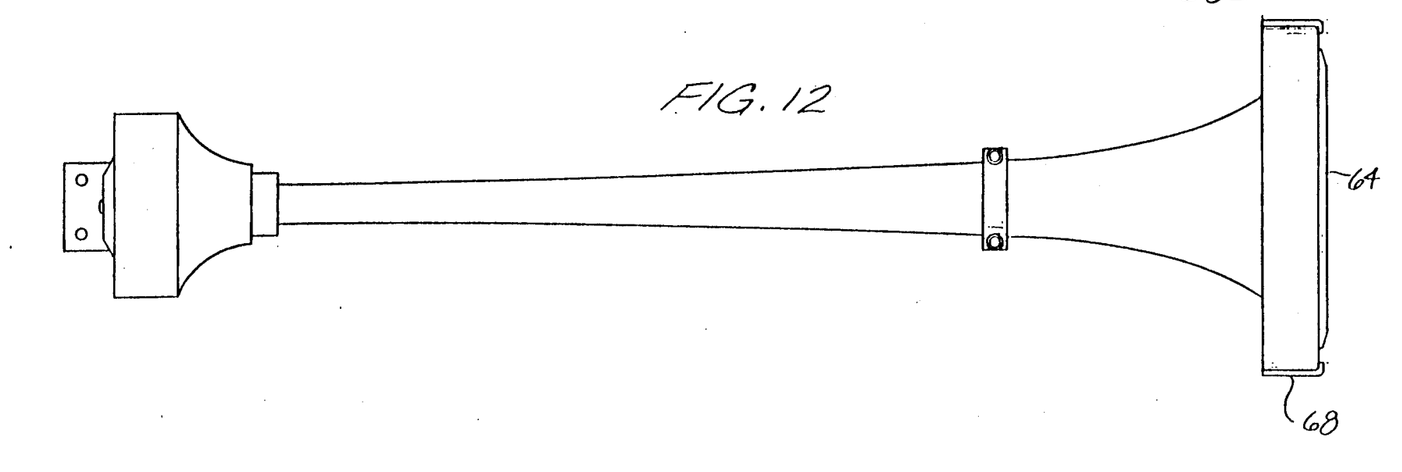
FIG. 12 is a top elevational view of the horn of FIG. 1.

As shown in FIG. 10, the outside edge of the shield 14 is wider than the end plate 62, so that there is a space 67 between the perimeter or edge of the shield and the perimeter or edge of the end plate 62. This allows the openings or slots 66 to be completely beyond the end plate 62. Any debris which enters the slots is allowed to pass directly through the space 67 between the edge of the end plate and the shield, instead of being forced into the horn's bell. As shown in FIGS. 11 and 12, the front wall 64 is surrounded by a side wall 68 which extends around the entire perimeter of the front wall backwards past the bell mouth. This side wall not only prevents debris from entering into the space between the front surface and the bell end plate, it also serves to help channel the sound coming out of the bell. Rather than being directed sideways, the sound is forced to either come forwards through the slots or rearward through the space between the side surface and the end plate. Since, as shown in FIGS. 9C and 10, there is a space 67 between the side wall 68 and the end plate all the way around the end plate, the shield projects a large amount of the horn's sound backwards. The proportion of sound projecting backwards or forwards can be varied by altering the relative sizes of the front and rear sound openings. FIG. 11 also shows a cutout 70 in the bottom of the shield which allows any debris which has accumulated in the space between the end plate and the shield or in the flare of the bell, to fall downwards and out the cutout. This is particularly important for condensation and moisture, however, it also serves as a last chance for debris to exit before it enters the horn.

Figure 13:
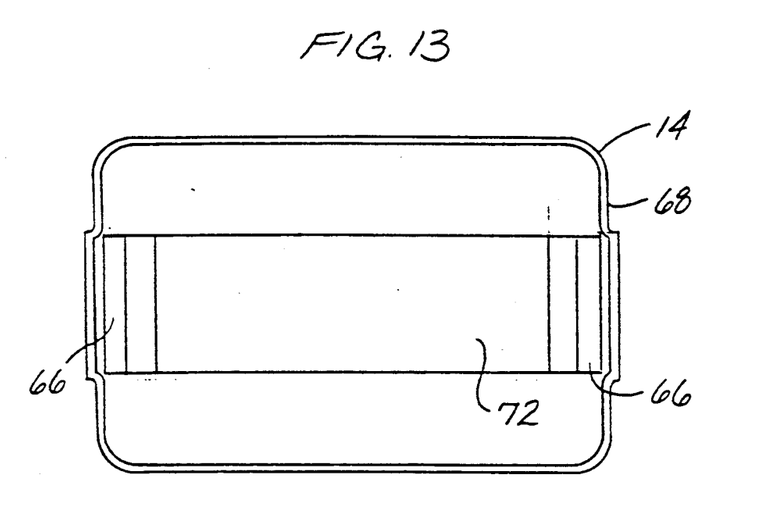
FIG. 13 is a rear elevational view of a shield removed from the bell.

As shown in FIG. 13, the inside surface of the front wall of the shield 14 includes a groove 72 that extends from one slot 66 to the other. This groove helps direct and guide sound emanating from the opening in the bell across the inside surface of the shield 14 towards the openings in the shield. This helps increase the amount of sound which emanates from the slot forwards over the amount which is directed backwards out the rear openings.

While a rectangular shield and bell mouth have been shown in the embodiments above, any other shape including square, oval or round may also be used. The sizes, shapes and locations of the sound openings can be varied to change the appearance and performance of the horn. The elongated groove can assume different forms to conform to different slot arrangements or be removed altogether. While only a few variations have been shown and described above, the inventor intends in no way to abandon the many variations and modifications within the spirit and scope of the present invention.

What is claimed is:

1. A shield for use on a vehicle horn, the horn having a bell mouth with a mouth periphery, the shield comprising:
    a front wall adapted to extend across the bell mouth and beyond the mouth periphery, spaced apart from and in front of the bell mouth, to allow sound from the bell mouth to travel beyond the mouth periphery; and
    a sound opening in the front wall adapted to be outside the mouth periphery to allow sound traveling beyond the mouth periphery to travel forward out the sound opening.

2. The shield of claim 1 wherein the shield is adapted to extend across a bell mouth pointed in a forward direction with respect to the vehicle, and the sound opening is adapted to allow sound to be directed in a forward direction with respect to the vehicle.

3. The shield of claim 1 wherein the shield is adapted to define a rear opening outside the mouth periphery aligned with the front sound opening to allow debris entering the front sound opening to exit through the rear sound opening.

4. The shield of claim 1 comprising a side wall extending from the periphery of the front wall to shield the space between the front wall and the bell mouth.

5. The shield of claim 4 wherein the side wall extends from substantially the entire perimeter of the front surface.

6. The shield of claim 4 wherein the side wall is adapted to extend behind the mouth periphery.

7. The shield of claim 6 wherein the side wall is adapted to be spaced apart from the mouth periphery to allow sound and debris to travel between the mouth periphery and the side wall.

8. The shield of claim 1 wherein the front sound opening comprises two slots located on opposite sides of the front wall from each other.

9. The shield of claim 1 wherein the front wall comprises a groove adapted to face the bell mouth and directed sound from the bell mouth towards a sound opening.

10. The shield of claim 1 wherein the front wall is substantially flat.

11. A shield for use on a vehicle horn, the horn having a bell mouth with a mouth periphery, the shield comprising:
    a front wall adapted to extend across the bell mouth and beyond the mouth periphery, spaced apart from and in front of the bell mouth, to allow sound from the bell mouth to travel beyond the mouth periphery;
    a sound opening in the front wall adapted to be outside the mouth periphery to allow sound traveling beyond the mouth periphery to travel forward out the sound opening; and
    a side wall extending from the periphery of the front wall to shield the space between the front wall and the bell mouth, wherein the side wall comprises a cutout for allowing debris collected in the space between the bell and the shield to move through the cutout out of the space.

12. A vehicle horn having a bell mouth and adapted to be mounted with the bell mouth facing a forward direction with respect to a vehicle comprising:
    a shield having a front wall spaced apart from the bell mouth and extending outside the bell mouth periphery and a sound opening in the front wall outside the bell mouth periphery for allowing sound to travel forwards from the bell mouth out the sound opening.

13. The horn of claim 12 wherein the shield defines a rear opening between the shield and the bell mouth periphery for allowing sound to travel backwards from the bell mouth out the rear sound opening.

14. The horn of claim 13 wherein the rear opening extends around substantially the entire bell mouth periphery.

15. The horn of claim 12 wherein the sound opening comprises two slots located on opposite sides of the front wall from each other.

16. The horn of claim 12 wherein the front wall comprises a sound guide facing the bell mouth for directing sound from the bell mouth to the sound opening.

17. The horn of claim 12 wherein the front wall of the shield is substantially flat.

18. The horn of claim 12 wherein the bell mouth comprises an end plate defining a sound path between the bell mouth and the shield front surface towards the sound opening.

19. The horn of claim 18 wherein the end plate comprises means for mounting the shield to the bell mouth.

20. The horn of claim 19 wherein the mounting means comprises a hole for receiving a bolt.

21. The horn of claim 18 wherein the end plate and shield front wall are substantially rectangular.

22. A vehicle horn comprising:
a tubular bell having a rear end and a front end, the front end having a mouth;
a sound unit coupled at the rear end of the bell to the inside of the bell for generating sound in the bell for emission from the bell mouth; and
a shield extending across substantially the entire bell mouth for deflecting foreign material, through which the horn travels, away from the bell mouth, the shield further extending outside the perimeter of the mouth and having a substantially forward facing opening through the shield to permit such foreign material to pass through the shield opening outside the perimeter of the bell mouth and away from the exterior of the bell, and to permit sound emanating from the bell mouth to pass forward through the opening.

23. The horn of the claim 22 wherein the shield comprises a front wall extending across the bell mouth for deflecting the material and a side wall extending from the front wall outside the perimeter of the bell mouth to deflect foreign material from the side of the bell mouth.

24. The horn of claim 22 wherein the side wall extends from substantially the entire perimeter of and is spaced laterally outside of the perimeter of the bell mouth.

25. The horn of claim 22 wherein the bell comprises an elongated rear tube portion and a front tube portion comprising said bell mouth and a clamp for clamping the front and rear tube portions together.

26. The horn of claim 25 wherein the clamp comprises a foot portion for attachment to the surface of a vehicle and a bracket for attaching the sound unit to the surface of the vehicle.

27. The horn of claim 26 wherein the front and rear tube portions each comprise a flange at an end thereof which abut the flange of the other tube portion, and wherein the clamp comprises a groove into which the flange of each tube portion extends to secure the tube portions together.

28. A vehicle horn comprising:
a first bell section having an opening at one end;
a second bell section having an opening at an end facing the first bell section end; and
a clamp adapted to receive the first and second bell section ends and hold the openings facing and adjacent to each other to form a continuous sound passage between the first and second bell sections.

29. A vehicle horn comprising:
a first bell section having an opening at one end;
a second bell section having an opening at an end facing the first bell section end; and
a clamp adapted to receive the first and second bell section ends and hold the openings facing each other to form a continuous sound passage between the first and second bell sections,
wherein the first and second bell section ends are adapted to butt against each other when held in the clamp.

30. The horn of claim 29 wherein the clamp comprises a first collar portion extending around one part of the first and second bell section ends and a second collar portion extending around another part of the first and second bell section ends and connectable to the first collar portion.

31. The horn of claim 29 wherein the clamp also comprises a pedestal for supporting the horn away from a surface.

32. A vehicle horn comprising:
a first bell section having an opening at one end;
a second bell section having an opening at an end facing the first bell section end; and
a clamp adapted to receive the first and second bell section ends and hold the openings facing each other to form a continuous sound passage between the first and second bell sections,
wherein the first and second bell section ends each comprise a flange for engaging the clamp.

33. The horn of claim 32 wherein the flanges extend outwards around the circumference of each end respectively and are adapted to butt against each other on respective surfaces of the flanges.

34. The horn of claim 32 wherein the clamp comprises a collar for substantially surrounding the first and second bell section ends and having an inner groove for receiving and retaining the first and second bell section flanges.

35. A vehicle horn mounting assembly for use with a horn having a rear mounting surface with elongated and converging surfaces comprising:
a rear mounting base with elongated and converging surfaces fastenable to a vehicle surface, the rear mounting base surface, the rear mounting base surfaces being adapted to slidably engage the horn rear mounting surface to mount the horn; and
a pedestal for slidably engaging the horn with the vehicle surface when the rear mounting surface is slidably engaged with the rear mounting base, the pedestal comprising a foot fastenable to the vehicle surface having spaced apart adjacent fingers adapted to receive a bolt in the space between the fingers.

36. A vehicle horn having a bell mouth and adapted to be mounted with the bell mouth facing a forward direction with respect to a vehicle comprising:
a shield having a front wall spaced apart from the bell mouth and extending beyond the bell mouth periphery;

a sound opening in the front wall outside the bell mouth periphery for allowing sound to travel forward from the bell mouth out the sound opening; and a side wall extending rearward from the front wall perimeter to shield the space between the bell mouth and the front wall.

37. The horn of claim 36 comprising a rear opening between the side wall and the bell mouth periphery for allowing sound to travel backwards from the bell mouth out the rear sound opening.

38. The horn of claim 37 wherein the rear opening is aligned with the front opening so that debris entering the front opening is allowed to exit through the rear opening.

39. The horn of claim 36 wherein the side wall extends further rearward than the bell mouth periphery.

40. A vehicle horn having a bell mouth and adapted to be mounted with the bell mouth facing a forward direction with respect to a vehicle comprising a shield having a front wall spaced apart from the bell mouth and extending outside the bell mouth periphery and a sound opening in the front wall outside the bell mouth periphery for allowing sound to travel forwards from the bell mouth out the sound opening, and wherein the shield comprises a side wall extending rearward from the front surface perimeter to shield the space between the bell mouth and the front wall.

41. The horn of claim 40 comprising a rear opening between the side wall and the bell mouth periphery for allowing sound to travel backwards from the bell mouth out the rear sound opening.

42. The horn of claim 41 wherein the rear opening is aligned with the front opening so that debris entering the front opening is allowed to exit through the rear opening.

43. The horn of claim 40 wherein the side walls extends further rearward than the bell mouth periphery.

44. A method for mounting a horn to a surface comprising:

sliding a forward portion of the horn into engagement with a forward mount on the vehicle; and simultaneously sliding a rearward portion of the horn in engagement with a rearward mount on the vehicle; and then locking the horn in place against at least one of either the rearward or forward mounts to prevent sliding motion of the horn out of engagement with the mounts, wherein the horn has a bell and the step of sliding a forward portion of the horn comprises sliding a pedestal fastened to the horn's bell and having spaced apart substantially parallel fingers opposite the bell into engagement with a bolt having a head so that the fingers engage the bolt head.

45. The method of claim 44 wherein the step of locking comprises tightening the bolt against the pedestal fingers.

46. A vehicle horn and mounting assembly comprising:

a forward mount fastenable to a vehicle for slidably engaging a forward portion of the horn;

a rearward mount fastenable to a vehicle for slidably engaging a rearward portion of the horn; and a lock for preventing sliding motion of the horn out of engagement with the mounts, wherein the forward mount comprises a bolt with a head and the forward portion of the horn comprises a pedestal having two spaced apart substantially parallel fingers for engaging the bolt head.

47. The assembly of claim 46 wherein the lock comprises the bolt, the bolt being tightenable against the pedestal fingers to prevent sliding motion.

48. A vehicle horn and mounting assembly comprising:

a forward mount fastenable to a vehicle for slidably engaging a forward portion of the horn;

a rearward mount fastenable to a vehicle for slidably engaging a rearward portion of the horn; and a lock for preventing sliding motion of the horn out of engagement with the mounts, wherein the rearward mount comprises elongated converging surfaces and the rearward portion of the horn comprises elongated converging surfaces adapted to slide into abutment with the mount surfaces to engage the mount and the elongated converging surfaces comprise elongated converging ribs and a mating elongated converging channel, the ribs butting against the channel for engagement.

* * * * *